United States Patent
Yosef et al.

(10) Patent No.: US 12,314,243 B1
(45) Date of Patent: May 27, 2025

(54) SYSTEM, METHOD, AND COMPUTER PROGRAM FOR ORCHESTRATING ASYNCHRONOUS PROCESSES TO PREVENT DATA CORRUPTION

(71) Applicant: Amdocs Development Limited, Limassol (CY)

(72) Inventors: Igal Yosef, Netanya (IL); Anna Roitman, Kadima-Tzoran, IL (US); Rajendra Koti, Vadodara (IN)

(73) Assignee: AMDOCS DEVELOPMENT LIMITED, Limassol (CY)

(*) Notice: Subject to any disclaimer, the term of this patent is extended or adjusted under 35 U.S.C. 154(b) by 94 days.

(21) Appl. No.: 17/982,263

(22) Filed: Nov. 7, 2022

(51) Int. Cl.
G06F 16/23 (2019.01)
G06F 9/54 (2006.01)

(52) U.S. Cl.
CPC ............ G06F 16/2365 (2019.01); G06F 9/54 (2013.01)

(58) Field of Classification Search
None
See application file for complete search history.

(56) References Cited

U.S. PATENT DOCUMENTS

| | | | |
|---|---|---|---|
| 6,990,503 B1* | 1/2006 | Luo ..................... | G06F 16/2343 |
| 2002/0103814 A1* | 8/2002 | Duvillier ................ | G06F 16/24 |
| 2003/0149709 A1* | 8/2003 | Banks ................... | G06F 16/273 |
| 2006/0059496 A1* | 3/2006 | Joy ...................... | G06F 11/3636 |
| | | | 719/310 |
| 2008/0250221 A1* | 10/2008 | Holt ........................ | G06F 9/52 |
| | | | 711/E12.069 |
| 2019/0340166 A1* | 11/2019 | Raman ................. | G06F 16/2255 |
| 2022/0004534 A1* | 1/2022 | Roenner ............ | H04L 67/1095 |

FOREIGN PATENT DOCUMENTS

| | | | | |
|---|---|---|---|---|
| GB | 2503330 A | * | 12/2013 | ........... G06F 9/4843 |
| WO | WO-0248919 A1 | * | 6/2002 | ........... G06F 16/219 |

OTHER PUBLICATIONS

Pusztai T, Rossi F, Dustdar S. Pogonip: Scheduling asynchronous applications on the edge. In2021 IEEE 14th International Conference on Cloud Computing (CLOUD) Sep. 5, 2021 (pp. 660-670). IEEE. (Year: 2021).*

Ben-Chaim Y, Gal A. Second order snapshot-log relations: Supporting multi-directional database replication using asynchronous snapshot replication. InInternational Workshop on Next Generation Information Technologies and Systems Jul. 4, 2006 (pp. 221-236) Berlin, Heidelberg: Springer Berlin Heidelberg. (Year: 2006).*

Larus, James R. "Compiling for shared-memory and message-passing computers." ACM Letters on Programming Languages and Systems (LOPLAS) 2, No. 1-4 (1993): 165-180. (Year: 1993).*

* cited by examiner

*Primary Examiner* — Uyen T Le
(74) *Attorney, Agent, or Firm* — Zilka-Kotab, P.C.

(57) ABSTRACT

As described herein, a system, method, and computer program are provided for orchestrating asynchronous processes to prevent data corruption. An orchestrator identifies a first asynchronous process executing in a computer system, wherein the first asynchronous process is configured to update data. The orchestrator detects activation of a second asynchronous process in the computer system which is configured to update the data. The orchestrator prevents the second asynchronous process from executing in the computer system to update the data at least while the first asynchronous process is executing in the computer system, to avoid simultaneous updates to the data by the first asynchronous process and the second asynchronous process.

18 Claims, 6 Drawing Sheets

SYSTEM, METHOD, AND COMPUTER PROGRAM FOR ORCHESTRATING ASYNCHRONOUS PROCESSES TO PREVENT DATA CORRUPTION

FIELD OF THE INVENTION

The present invention relates to managing asynchronous processes in a computer system.

BACKGROUND

When multiple asynchronous processes run in parallel within a computer system, it is possible that two or more of these processes may operate on the same data. Due to the asynchronous nature of the processes, consistency in the data is not ensured, meaning that the processes may operate in parallel to overwrite (i.e. update) the same data at the same time, thereby causing corruption of the data.

There is thus a need for addressing these and/or other issues associated with the prior art. In particular, there is a need for a mechanism to prevent data corruption caused by parallel running asynchronous processes.

SUMMARY

As described herein, a system, method, and computer program are provided for orchestrating asynchronous processes to prevent data corruption. An orchestrator identifies a first asynchronous process executing in a computer system, wherein the first asynchronous process is configured to update data. The orchestrator detects activation of a second asynchronous process in the computer system which is configured to update the data. The orchestrator prevents the second asynchronous process from executing in the computer system to update the data at least while the first asynchronous process is executing in the computer system, to avoid simultaneous updates to the data by the first asynchronous process and the second asynchronous process.

DETAILED DESCRIPTION

Figure 1:
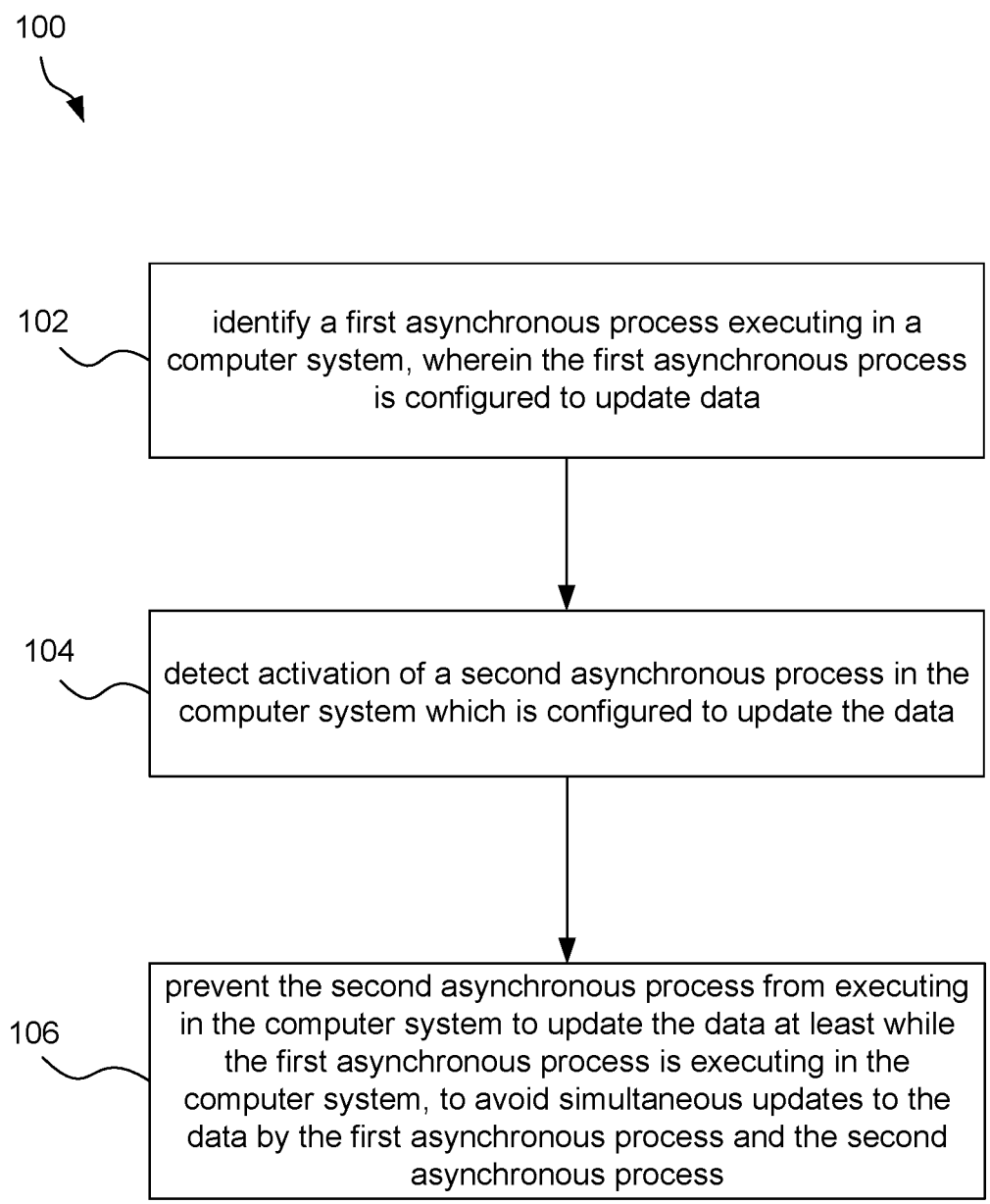
FIG. 1 illustrates a method for orchestrating asynchronous processes to prevent data corruption, in accordance with one embodiment.

FIG. 1 illustrates a method 100 for orchestrating asynchronous processes to prevent data corruption, in accordance with one embodiment. The method 100 is performed by an orchestrator configured to orchestrate the asynchronous processes of a computer system. The orchestrator may be implemented in hardware and/or software of the computer system or in hardware and/or software of a remote computer system. Thus, the method 100 may be performed by any of the computer systems described below with respect to FIGS. 5 and/or 6.

With respect to the present description, an asynchronous process refers to a process that is configured to execute independently of other processes. Accordingly, dependencies will not exist between two asynchronous processes. The orchestrator of the present description is configured to orchestrate asynchronous processes that would otherwise not be synchronized, particularly in a situation where these asynchronous processes are configured to update (e.g. change, overwrite, etc.) the same data (i.e. the same location in memory) such that their parallel execution would risk causing parallel updates to the same data and thus corruption of the data.

In an embodiment, each asynchronous process of a plurality of asynchronous processes of the computer system may be configured to notify the orchestrator of an activation of the asynchronous process in the computer system. In an embodiment, each asynchronous process of the plurality of asynchronous processes of the computer system may be configured to notify the orchestrator of a completion of an execution of the asynchronous process in the computer system. In this way, the orchestrator may keep track of an execution status of each asynchronous process in the computer system (e.g. activated, executing, completed), for use in orchestrating such asynchronous processes in a manner that prevents data corruption.

In operation 102, a first asynchronous process executing in a computer system is identified, wherein the first asynchronous process is configured to update data. As noted above, the first asynchronous process may be identified based on a known execution status of the first asynchronous process by the orchestrator. For example, the first asynchronous process may notify the orchestrator of its activation. In this case, execution of the first asynchronous process may have been be allowed to proceed by the orchestrator, and the orchestrator may not yet have been notified by the first asynchronous process that its execution has completed.

In operation 104, activation of a second asynchronous process in the computer system which is configured to update the data is detected. In an embodiment, the activation of the second asynchronous process may be detected by the orchestrator responsive to the second asynchronous process notifying the orchestrator of the activation of the second asynchronous process. Activation of a process refers to a request, or command, to execute the process. The second asynchronous process may be activated by a user or by another process executing in the computer system.

It should be noted that, as mentioned above, the first asynchronous process and the second asynchronous process are configured to update the same data. In an embodiment, the configuration of the first asynchronous process and the second asynchronous process to update the data may be determined by the orchestrator using a predefined mapping (or list) of asynchronous processes that operate to update the same data.

In operation 106, the second asynchronous process is prevented from executing in the computer system to update the data at least while the first asynchronous process is executing in the computer system, to avoid simultaneous updates to the data by the first asynchronous process and the second asynchronous process. In one embodiment, preventing the second asynchronous process from executing in the computer system to update the data may include preventing execution of an entirety of the second asynchronous process while the first asynchronous process is executing in the computer system.

In another embodiment, preventing the second asynchronous process from executing in the computer system to update the data may include preventing execution of only a portion of the second asynchronous process that operates to update the data. In yet another embodiment, updating of the data by the second asynchronous process may be detected (by the orchestrator) in runtime to prevent execution of only the portion of the second asynchronous process that operates to update the data, such that any remaining portion of the second asynchronous process may still be allowed to execute while the first asynchronous process is executing in the computer system.

In an embodiment, preventing the second asynchronous process from executing in the computer system to update the data at least while the first asynchronous process is executing in the computer system may include pausing execution of the second asynchronous process in the computer system to update the data until execution of the first asynchronous process completes. For example, execution of the second asynchronous process to update the data may be held in a process queue until execution of the first asynchronous process completes. In an embodiment, execution of the second asynchronous process to update the data may be paused until execution of the first asynchronous process completes, using a scheduler. It may be detected (by the orchestrator) that execution of the first asynchronous process has completed responsive to the first asynchronous process sending (to the orchestrator) a notification of the completion of the execution of the asynchronous process in the computer system.

Once the execution of the first asynchronous process has completed, execution of the (i.e. paused) second asynchronous process in the computer system may be initiated (i.e. by the orchestrator). For example, the execution of the second asynchronous process to update the data may be initiated from the process queue.

In another embodiment, preventing the second asynchronous process from executing in the computer system to update the data at least while the first asynchronous process is executing in the computer system may include rejecting execution of the second asynchronous process in the computer system to update the data. In this case, a source of the activation of the second asynchronous process (i.e. the user or source application/process) may be notified that the execution of the second asynchronous process has been rejected. In an embodiment, the notification may allow the source to re-activate the second asynchronous process at a later time.

To this end, the method 100 may be performed to orchestrate execution of the first and second asynchronous processes in a manner that avoids (i.e. prevents) simultaneous updates to the same data by the first and second asynchronous processes. Avoiding such simultaneous updates may in turn prevent corruption of the data otherwise resulting from the two processes updating the same data at the same time.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
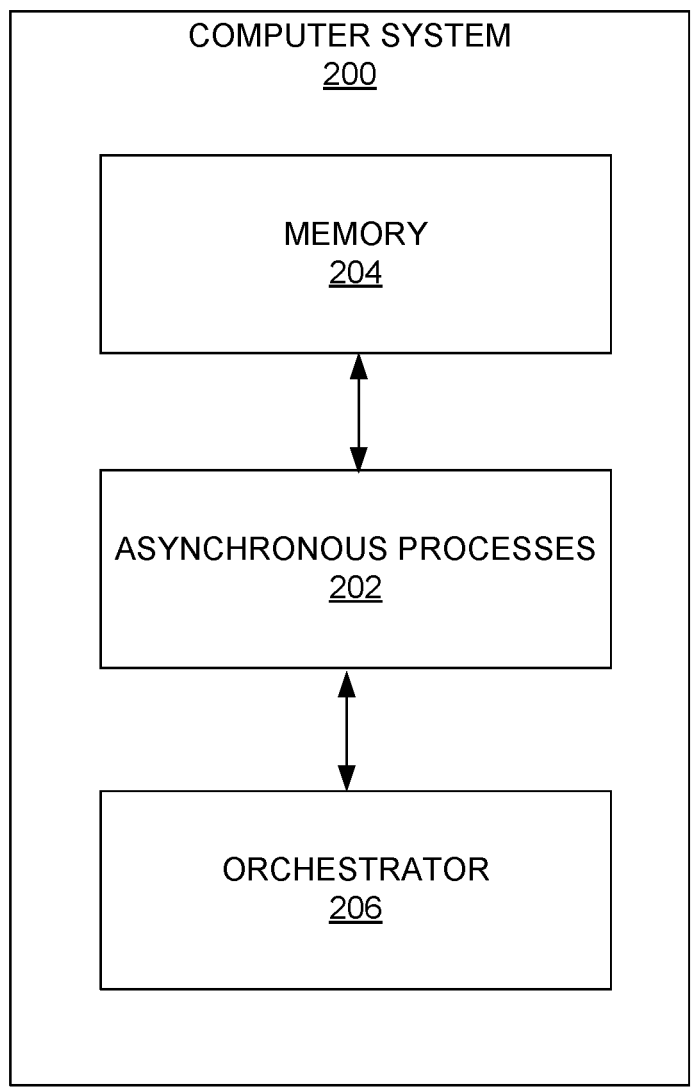
FIG. 2 illustrates a computer system for orchestrating asynchronous processes to prevent data corruption, in accordance with one embodiment.

FIG. 2 illustrates a computer system 200 for orchestrating asynchronous processes to prevent data corruption, in accordance with one embodiment. As an option, the computer system 200 may be implemented in the context of the details of the previous figure and/or any subsequent figure(s). Of course, however, the computer system 200 may be implemented in the context of any desired environment. Further, the aforementioned definitions may equally apply to the description below.

It should be noted that while components 202-206 are illustrated as being installed on a same computer system, other embodiments are contemplated in which one or more of the components may be installed on different computer systems but remotely accessible (e.g. via one or more networks).

As shown, the computer system 200 includes a plurality of asynchronous processes 202. The asynchronous processes 202 are configured to perform one or more functions that at least include updating data in memory 204 of the computer system 200. The asynchronous processes 202 may be activated by users (e.g. via a user interface of the computer system 200) and/or applications (e.g. executing on the computer system 200) and/or other processes (e.g. executing on the computer system 200) which themselves may be or may not be asynchronous.

As mentioned above, the asynchronous processes 202 are each configured to update certain data in the memory 204 (i.e. a particular memory location). In the context of the present description, at least a first one of the asynchronous processes 202 and a second one of the asynchronous processes 202 are configured to update the same data in the memory 204. To avoid simultaneous updates to the same data by the first and second asynchronous processes 202, the computer system 200 includes an orchestrator 206 that manages execution of the first and second asynchronous processes 202 to prevent simultaneous updating of the data by the first and second asynchronous processes 202 (thereby preventing any resulting corruption of the data).

The orchestrator 206 has knowledge of all of the asynchronous processes 202 existing in the computer system 200. The orchestrator 206 also has knowledge of which data in the memory 204 each of the of the asynchronous processes 202 is configured to update. In an embodiment, the orchestrator 206 stores a mapping of subsets of the asynchronous processes 202 that are configured to update the same data in the memory 204.

The orchestrator 206 keeps track of a status of each of the asynchronous processes 202, including when the asynchronous processes 202 have been activated, are being executed, and have completed execution. The asynchronous processes 202 may be configured to notify the orchestrator 206 of when they have been activated and when they have completed execution. Since the orchestrator 206 may permit/deny execution of each of the asynchronous processes 202 upon its activation, as disclosed herein, the orchestrator 206 may also be aware of when the asynchronous processes 202 are executing (i.e. between permitting the execution up until notification of the completion of the execution has been received).

Returning to the situation where the first and second asynchronous processes 202 are configured to update the same data, the orchestrator 206 knows when the first asynchronous process is executing and will manage execution of the second asynchronous process when activated during the execution of the first asynchronous process. In particular, the orchestrator 206 will prevent the second asynchronous process from executing in the computer system 200 to update the data at least while the first asynchronous process is executing in the computer system 200, to avoid simultaneous updates to the data by the first and second asynchronous processes 202.

In an embodiment, the orchestrator 206 may prevent execution of an entirety of the second asynchronous process while the first asynchronous process is executing in the computer system 200 or may prevent only a portion of the second asynchronous process that operates to actually update the data (i.e. by permitting execution of the second asynchronous process and then monitoring a runtime of the execution of the second asynchronous process to detect when the second asynchronous process is about to update the data and to prevent the second asynchronous process from updating the data).

In an embodiment, the orchestrator 206 may include a process queue that holds (pauses) the second asynchronous process until the execution of the first asynchronous process has completed. In another embodiment, the orchestrator 206 may simply reject the execution of the second asynchronous process, thus requiring its re-activation at a later time. In this case, the orchestrator 206 may notify a source of the activation of the second asynchronous process that the execution of the second asynchronous process has been rejected. In an embodiment, the notification may allow the source to re-activate the second asynchronous process at a later time.

Figure 3:
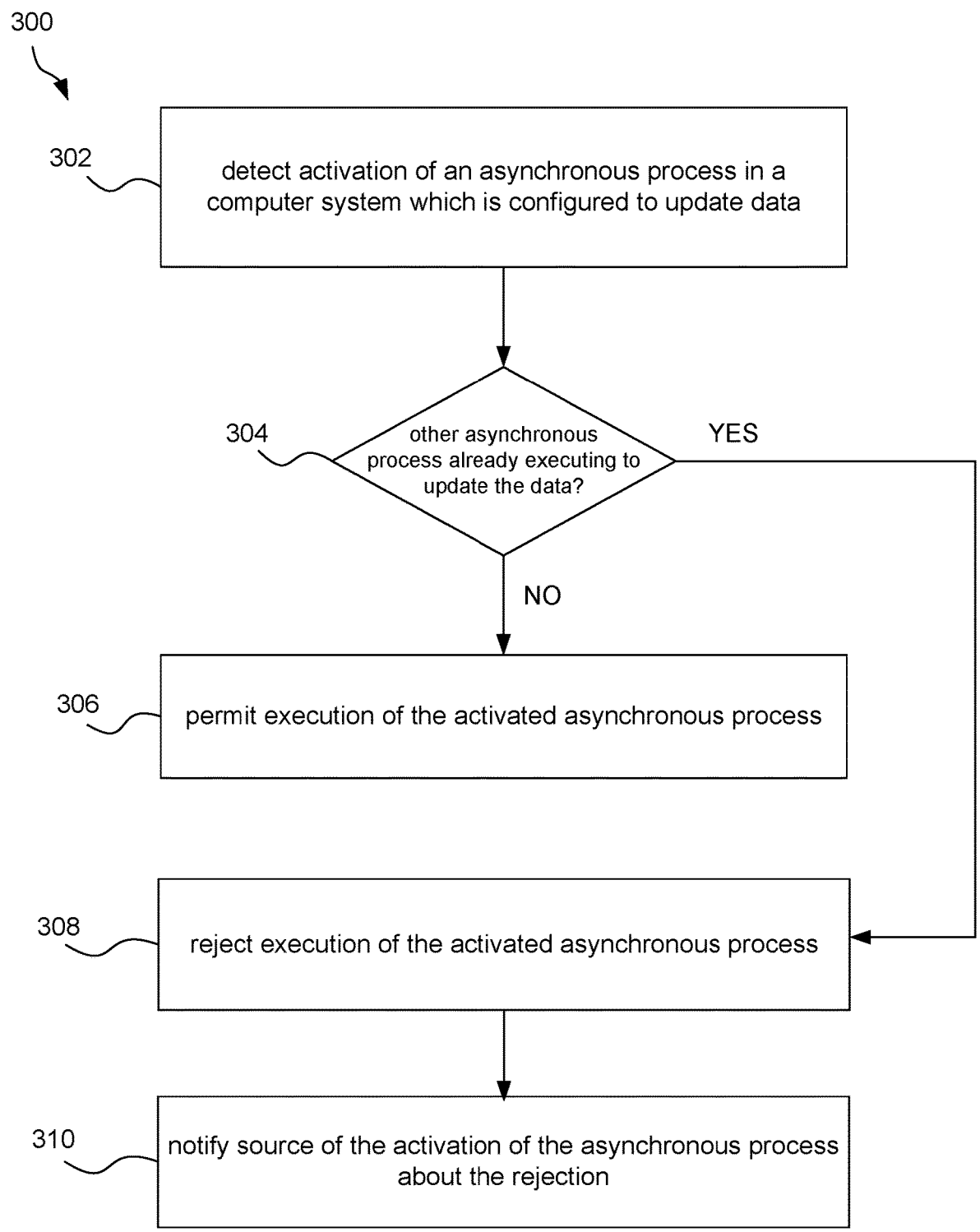
FIG. 3 illustrates a method for rejecting execution of an asynchronous process conflicting with an already executing asynchronous process, in accordance with one embodiment.

FIG. 3 illustrates a method 300 for rejecting execution of an asynchronous process conflicting with an already executing asynchronous process, in accordance with one embodiment. As an option, the method 300 may be carried out in the context of the details of the previous figure and/or any subsequent figure(s). For example, the method 300 may be carried out by the orchestrator 206 of FIG. 2. Of course, however, the method 300 may be carried out in the context of any desired environment. Further, the aforementioned definitions may equally apply to the description below.

In operation 302, activation of an asynchronous process in a computer system which is configured to update data is detected. In operation 304, it is determined whether another asynchronous process is already executing in the computer system to update the data. If it is determined in decision 304 that another asynchronous process is not already executing in the computer system to update the data, then execution of the activated asynchronous process is permitted, as shown in operation 306.

If it is determined in decision 304 that another asynchronous process is already executing in the computer system to update the data, then execution of the activated asynchronous process is rejected, as shown in operation 308. Further, a source of the activation of the asynchronous process is notified about the rejection.

Figure 4:
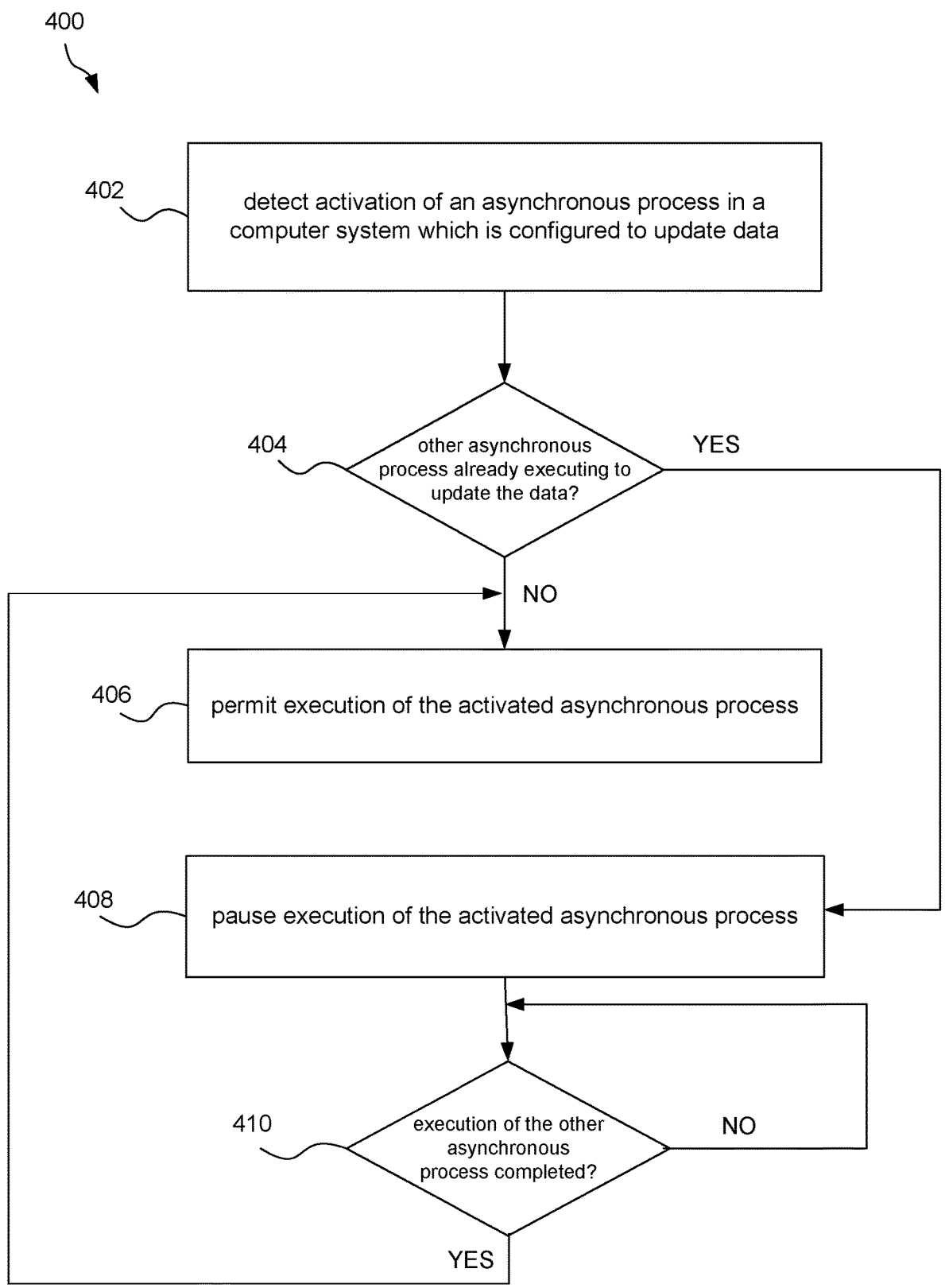
FIG. 4 illustrates a method for pausing execution of an asynchronous process conflicting with an already executing asynchronous process, in accordance with one embodiment.

FIG. 4 illustrates a method 400 for pausing execution of an asynchronous process conflicting with an already executing asynchronous process, in accordance with one embodiment. As an option, the method 400 may be carried out in the context of the details of the previous figure and/or any subsequent figure(s). For example, the method 400 may be carried out by the orchestrator 206 of FIG. 2. Of course, however, the method 400 may be carried out in the context of any desired environment. Further, the aforementioned definitions may equally apply to the description below.

In operation 402, activation of an asynchronous process in a computer system which is configured to update data is detected. In operation 404, it is determined whether another asynchronous process is already executing in the computer system to update the data. If it is determined in decision 404 that another asynchronous process is not already executing in the computer system to update the data, then execution of the activated asynchronous process is permitted, as shown in operation 406.

If it is determined in decision 404 that another asynchronous process is already executing in the computer system to update the data, then execution of the activated asynchronous process is paused, as shown in operation 408. After some predefined period of time has passed, it is determined in decision 410 whether execution of the other asynchronous process has completed.

If it is determined in decision 410 that execution of the other asynchronous process has completed, then the method 400 returns to operation 406 to permit execution of the activated asynchronous process. If it is determined in decision 410 that execution of the other asynchronous process has not completed, then after some predefined period of time has passed, it is again determined in decision 410 whether execution of the other asynchronous process has completed (which may be repeated until it is determined that execution of the other asynchronous process has completed).

Figure 5:
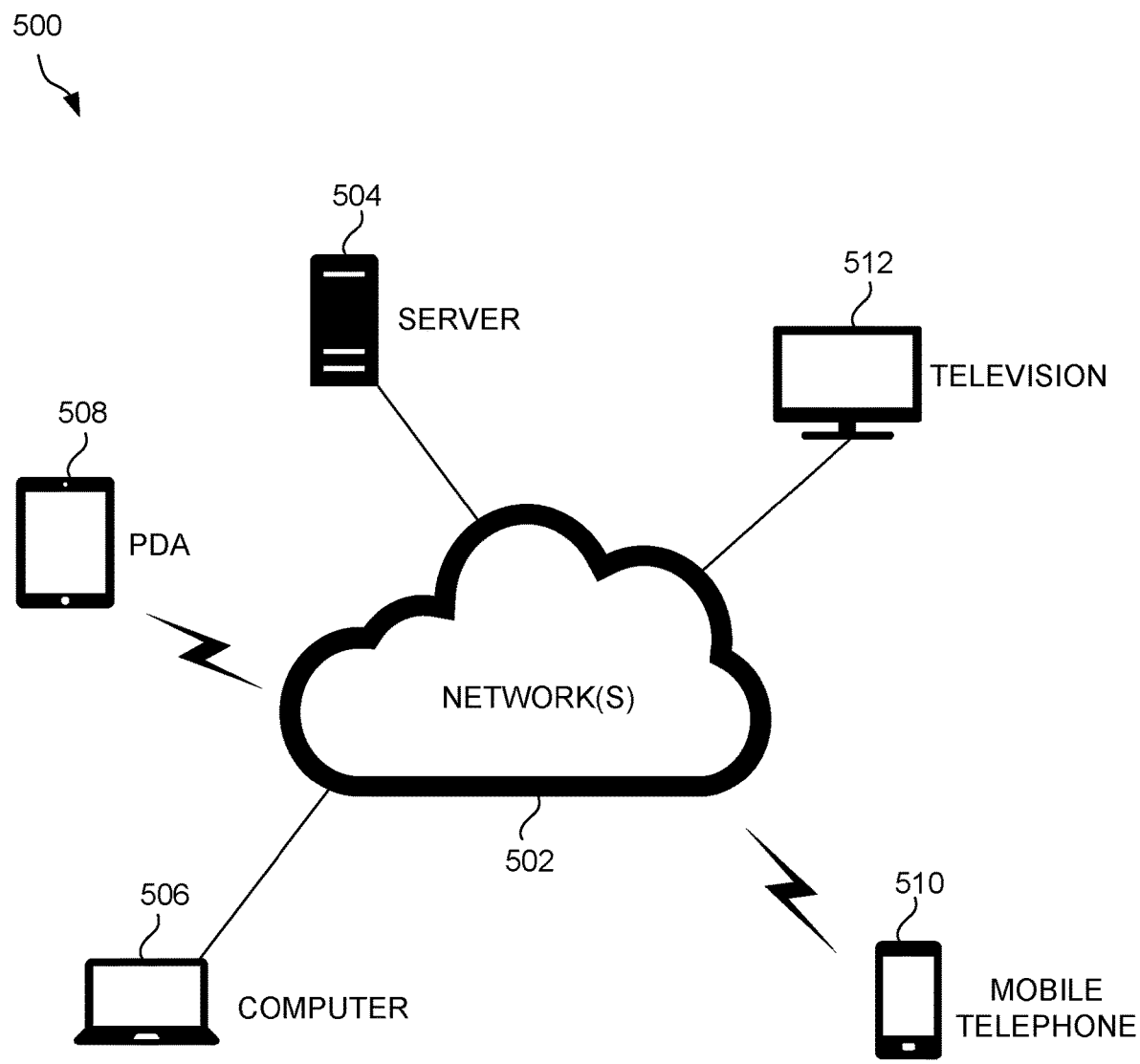
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
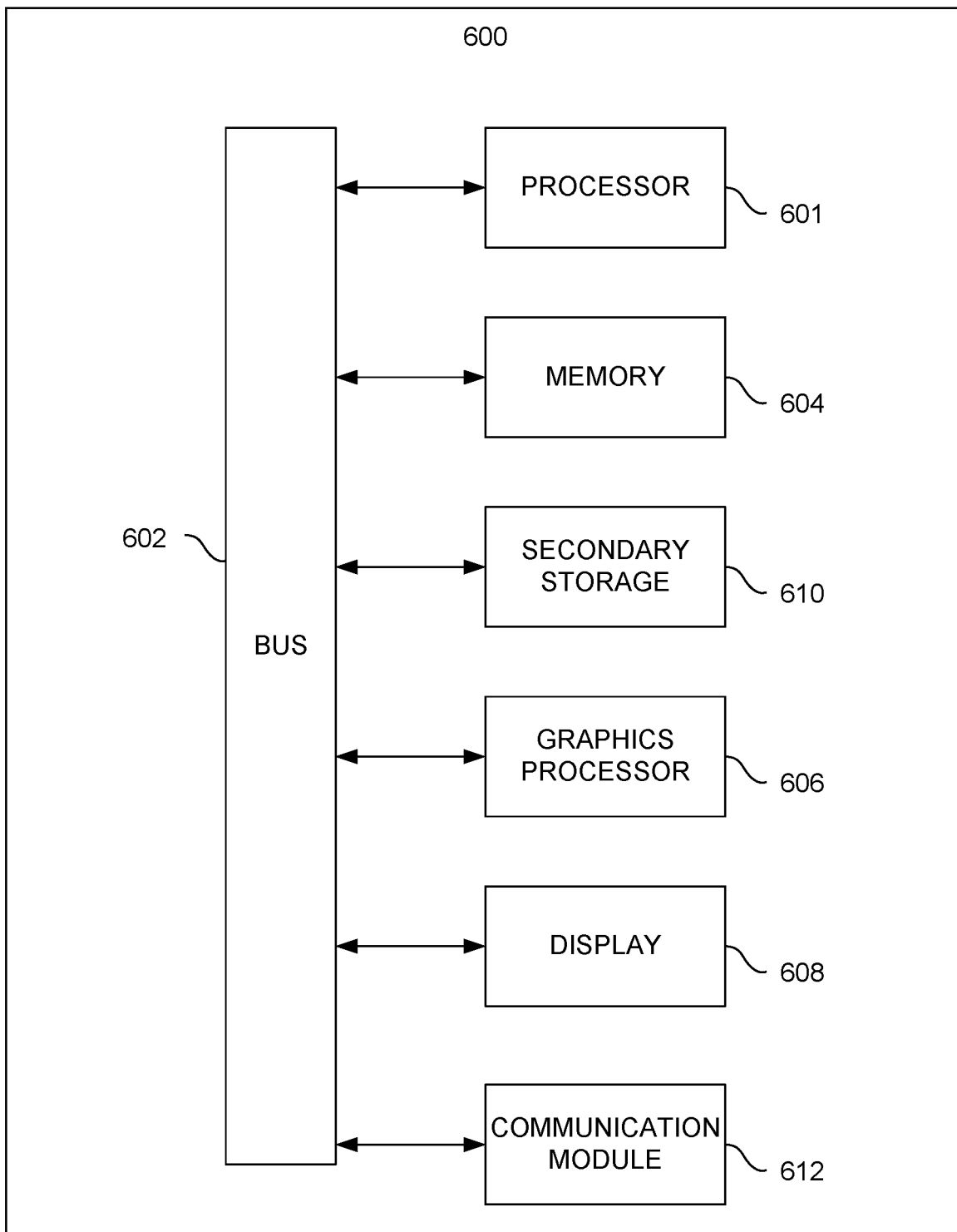
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   identify, by an orchestration system configured to orchestrate asynchronous processes executing in a single computer system that share a same memory of the single computer system, that a first asynchronous process is executing in the single computer system, wherein the first asynchronous process is configured to update data at a location in the memory of the single computer system;
   detect, by the orchestration system, activation of a second asynchronous process in the single computer system which is configured to update the data at the location in the memory of the single computer system;
   responsive to detecting activation of the second asynchronous process, access, by the orchestration system, a predefined mapping of the asynchronous processes that indicates subsets of the asynchronous processes, wherein the asynchronous processes in each subset are configured to operate to update data at a same location in the same memory of the single computer system;
   determine, by the orchestration system based on the predefined mapping of the asynchronous processes, that the first asynchronous process and the second asynchronous process are mapped to one another indicating that the first asynchronous process and the second asynchronous process are configured to update data at a same location in the same memory of the single computer system;
   in response to determining that the first asynchronous process and the second asynchronous process are mapped to one another, prevent, by the orchestration system, the second asynchronous process from executing in the single computer system to update the data at the location in the memory at least while the first asynchronous process is executing in the single computer system, to avoid simultaneous updates to the data at the location in the memory of the single computer system by the first asynchronous process and the second asynchronous process.

2. The non-transitory computer-readable media of claim 1, wherein each asynchronous process of a plurality of asynchronous processes of the single computer system, including at least the first asynchronous process and the second asynchronous process, is configured to notify the orchestration system of an activation of the asynchronous process in the computer system.

3. The non-transitory computer-readable media of claim 2, wherein the activation of the second asynchronous process is detected by the orchestration system responsive to the second asynchronous process notifying the orchestrator of the activation of the second asynchronous process.

4. The non-transitory computer-readable media of claim 1, wherein preventing, by the orchestration system, the second asynchronous process from executing in the single computer system to update the data at least while the first asynchronous process is executing in the single computer system includes:
   pausing execution of the second asynchronous process in the single computer system to update the data until execution of the first asynchronous process completes.

5. The non-transitory computer-readable media of claim 4, wherein execution of the second asynchronous process to update the data is held in a process queue until execution of the first asynchronous process completes.

6. The non-transitory computer-readable media of claim 4, wherein execution of the second asynchronous process to update the data is paused until execution of the first asynchronous process completes, using a scheduler.

7. The non-transitory computer-readable media of claim 4, wherein each asynchronous process of a plurality of asynchronous processes of the single computer system, including at least the first asynchronous process and the second asynchronous process, is configured to notify the orchestration system of a completion of an execution of the asynchronous process in the single computer system.

8. The non-transitory computer-readable media of claim 7, wherein the completion of the execution of the first asynchronous process is detected by the orchestrator responsive to the first asynchronous process notifying the orchestration system of the completion of the execution of the first asynchronous process.

9. The non-transitory computer-readable media of claim 1, wherein preventing, by the orchestration system, the second asynchronous process from executing in the single computer system to update the data at least while the first asynchronous process is executing in the single computer system includes:
   rejecting execution of the second asynchronous process in the single computer system to update the data.

10. The non-transitory computer-readable media of claim 9, wherein preventing, by the orchestration system, the second asynchronous process from executing in the single computer system at least while the first asynchronous process is executing in the single computer system further includes:
    notifying a source of the activation of the second asynchronous process that the execution of the second asynchronous process has been rejected.

11. The non-transitory computer-readable media of claim 1, wherein preventing, by the orchestration system, the second asynchronous process from executing in the single computer system to update the data includes preventing execution of an entirety of the second asynchronous process.

12. The non-transitory computer-readable media of claim 1, wherein preventing, by the orchestration system, the second asynchronous process from executing in the single computer system to update the data includes preventing execution of only a portion of the second asynchronous process that operates to update the data.

13. The non-transitory computer-readable media of claim 12, wherein updating of the data by the second asynchronous process is detected by the orchestration system in runtime to prevent execution of only the portion of the second asynchronous process that operates to update the data.

14. The non-transitory computer-readable media of claim 1, wherein simultaneous updates to the data by the first asynchronous process and the second asynchronous process is avoided to prevent corruption of the data.

15. The non-transitory computer-readable media of claim 1, wherein the orchestration system keeps track of a status of each of the asynchronous processes of the single computer system, wherein the status of each of the asynchronous processes at any given point in time is selected from:
    activated,
    being executed, and
    completed execution.

16. The non-transitory computer-readable media of claim 15, wherein each of the asynchronous processes is configured to notify the orchestration system of its activation and of its completed execution.

17. A method, comprising:

at a computer system:

identifying, by an orchestration system configured to orchestrate asynchronous processes executing in a single computer system that share a same memory of the single computer system, that a first asynchronous process is executing in the single computer system, wherein the first asynchronous process is configured to update data at a location in the memory of the single computer system;

detecting, by the orchestration system, activation of a second asynchronous process in the single computer system which is configured to update the data at the location in the memory of the single computer system;

responsive to detecting activation of the second asynchronous process, accessing, by the orchestration system, a predefined mapping of the asynchronous processes that indicates subsets of the asynchronous processes, wherein the asynchronous processes in each subset are configured to operate to update data at a same location in the same memory of the single computer system;

determining, by the orchestration system based on the predefined mapping of the asynchronous processes, that the first asynchronous process and the second asynchronous process are mapped to one another indicating that the first asynchronous process and the second asynchronous process are configured to update data at a same location in the same memory of the single computer system;

in response to determining that the first asynchronous process and the second asynchronous process are mapped to one another, preventing, by the orchestration system, the second asynchronous process from executing in the single computer system to update the data at the location in the memory at least while the first asynchronous process is executing in the single computer system, to avoid simultaneous updates to the data at the location in the memory of the single computer system by the first asynchronous process and the second asynchronous process.

18. A system, comprising:

a non-transitory memory storing instructions; and one or more processors in communication with the non-transitory memory that execute the instructions to:

identify, by an orchestration system configured to orchestrate asynchronous processes executing in a single computer system that share a same memory of the single computer system, that a first asynchronous process is executing in the single computer system, wherein the first asynchronous process is configured to update data at a location in the memory of the single computer system;

detect, by the orchestration system, activation of a second asynchronous process in the single computer system which is configured to update the data at the location in the memory of the single computer system;

responsive to detecting activation of the second asynchronous process, access, by the orchestration system, a predefined mapping of the asynchronous processes that indicates subsets of the asynchronous processes, wherein the asynchronous processes in each subset are configured to operate to update data at a same location in the same memory of the single computer system;

determine, by the orchestration system based on the predefined mapping of the asynchronous processes, that the first asynchronous process and the second asynchronous process are mapped to one another indicating that the first asynchronous process and the second asynchronous process are configured to update data at a same location in the same memory of the single computer system;

in response to determining that the first asynchronous process and the second asynchronous process are mapped to one another, prevent, by the orchestration system, the second asynchronous process from executing in the single computer system to update the data at the location in the memory at least while the first asynchronous process is executing in the single computer system, to avoid simultaneous updates to the data at the location in the memory of the single computer system by the first asynchronous process and the second asynchronous process.

* * * * *